US012784242B2

(12) United States Patent
Piuze-Phaneuf et al.

(10) Patent No.: US 12,784,242 B2
(45) Date of Patent: Nov. 3, 2026

(54) TEMPORALLY STABLE PERSPECTIVE CORRECTION

(71) Applicant: Apple Inc., Cupertino, CA (US)

(72) Inventors: Emmanuel Piuze-Phaneuf, Los Gatos, CA (US); Maxime Meilland, San Jose, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 18/242,339

(22) Filed: Sep. 5, 2023

(65) Prior Publication Data

US 2024/0078692 A1 Mar. 7, 2024

Related U.S. Application Data

(60) Provisional application No. 63/403,938, filed on Sep. 6, 2022.

(51) Int. Cl.
*G06T 7/50* (2017.01)
*G06T 17/20* (2006.01)

(52) U.S. Cl.
CPC ................ *G06T 7/50* (2017.01); *G06T 17/20* (2013.01)

(58) Field of Classification Search
None
See application file for complete search history.

(56) References Cited

U.S. PATENT DOCUMENTS 8,594,425 B2 * 11/2013 Gurman ................. G06V 20/64 382/173
11,398,095 B2 * 7/2022 Guizilini ................... G06T 7/70
2004/0189796 A1 * 9/2004 Ho ....................... H04N 13/261 348/42
2014/0119604 A1 * 5/2014 Mai ........................ G06V 20/00 382/103
2015/0016713 A1 * 1/2015 Mori ....................... G06T 7/254 382/154

(Continued)

OTHER PUBLICATIONS

Bescos, Berta, et al. "DynaSLAM: Tracking, mapping, and inpainting in dynamic scenes." IEEE robotics and automation letters 3.4 (2018): 4076-4083.*

(Continued)

*Primary Examiner* — Sultana M Zalalee
(74) *Attorney, Agent, or Firm* — Fernando & Partners, LLP

(57) ABSTRACT

In one implementation, a method of performing perspective correction is performed by a device including an image sensor, a display, one or more processors, and non-transitory memory. The method includes capturing, using the image sensor, an image of a physical environment. The method includes obtaining a depth map including a plurality of depths respectively associated with a plurality of pixels of the image of the physical environment, wherein the depth map includes, for a particular pixel at a particular pixel location representing a dynamic object in the physical environment, a particular depth corresponding to a distance between the image sensor and a static object in the physical environment behind the dynamic object. The method includes transforming, using the one or more processors, the image of the physical environment based on the depth map. The method includes displaying, on the display, the transformed image.

20 Claims, 13 Drawing Sheets

(56) References Cited

U.S. PATENT DOCUMENTS

| | | | | |
|---|---|---|---|---|
| 2016/0005228 | A1* | 1/2016 | Niebla, Jr. | H04N 13/122 348/43 |
| 2017/0046868 | A1* | 2/2017 | Chernov | G06T 7/246 |
| 2017/0188002 | A1* | 6/2017 | Chan | H04N 13/122 |
| 2019/0101758 | A1* | 4/2019 | Zhu | G06T 3/00 |
| 2020/0302688 | A1* | 9/2020 | Hosfield | A63F 13/211 |
| 2020/0342652 | A1* | 10/2020 | Rowell | G06V 10/82 |
| 2021/0084278 | A1* | 3/2021 | Harviainen | H04N 13/332 |
| 2022/0174261 | A1* | 6/2022 | Hornstein | G06N 20/00 |
| 2023/0050857 | A1* | 2/2023 | Allan | G06T 7/50 |
| 2023/0319218 | A1* | 10/2023 | Ren | G06T 3/4038 382/284 |
| 2023/0410414 | A1* | 12/2023 | Xiong | G06F 3/013 |
| 2024/0098232 | A1* | 3/2024 | Piuze-Phaneuf | H04N 13/111 |
| 2024/0202866 | A1* | 6/2024 | Barakat | G02B 27/017 |

OTHER PUBLICATIONS

Bescós, Berta, et al. "Removing dynamic objects from 3d maps using geometry and learning." IEEE Conf. on Intelligent Robots and Systems (IROS) workshop of learning for localization and mapping. 2017.

Yin, Canben, et al. "Removing dynamic 3D objects from point clouds of a moving RGB-D camera." 2015 IEEE International Conference on Information and Automation. IEEE, 2015.

PCT International Search Report and Written Opinion dated Dec. 13, 2023, PCT International Application No. PCT/US2023/031992, pp. 1-13.

* cited by examiner

TEMPORALLY STABLE PERSPECTIVE CORRECTION

CROSS-REFERENCE TO RELATED APPLICATIONS

This application claims priority to U.S. Provisional App. No. 63/403,938, filed on Sep. 6, 2022, which is hereby incorporated by reference in its entirety.

TECHNICAL FIELD

The present disclosure generally relates to systems, methods, and devices for performing temporally stable perspective correction.

BACKGROUND

In various implementations, an extended reality (XR) environment is presented by a head-mounted device (HMD). Various HMDs include a scene camera that captures an image of the physical environment in which the user is present (e.g., a scene) and a display that displays the image to the user. In some instances, this image or portions thereof can be combined with one or more virtual objects to present the user with an XR experience. In other instances, the HMD can operate in a pass-through mode in which the image or portions thereof are presented to the user without the addition of virtual objects. Ideally, the image of the physical environment presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
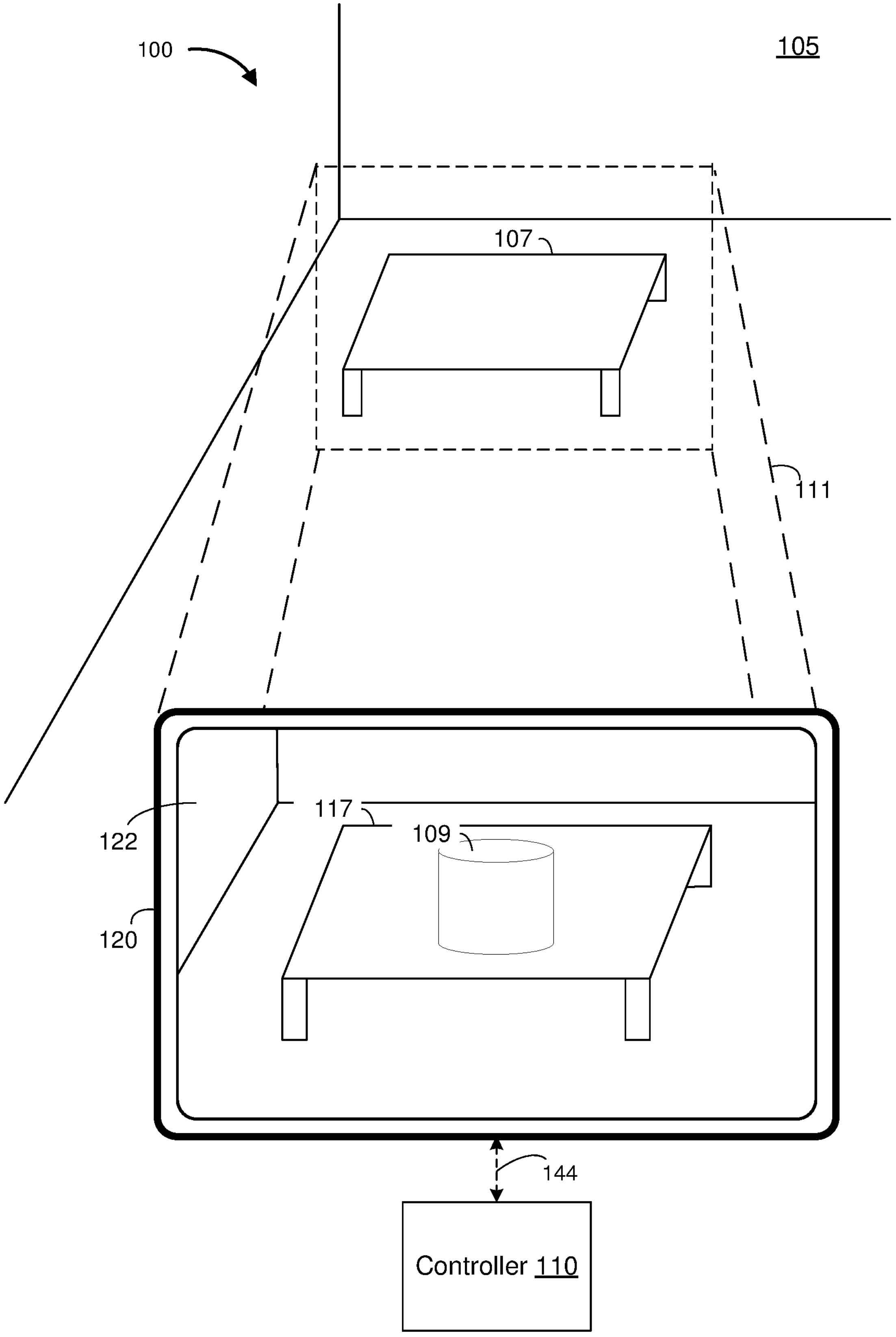
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and method for performing perspective correction. In various implementations, the method is performed by a device including an image sensor, a display, one or more processors, and non-transitory memory. The method includes capturing, using the image sensor, an image of a physical environment. The method includes obtaining a depth map including a plurality of depths respectively associated with a plurality of pixels of the image of the physical environment, wherein the depth map includes, for a particular pixel at a particular pixel location representing a dynamic object in the physical environment, a particular depth corresponding to a distance between the image sensor and a static object in the physical environment behind the dynamic object. The method includes transforming, using the one or more processors, the image of the physical environment based on the depth map. The method includes displaying, on the display, the transformed image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in an HMD with a display and a scene camera, the image of the physical environment presented to the user on the display may not always reflect what the user would see if the HMD were not present due to the different positions of the eyes, the display, and the camera in space. In various circumstances, this results in poor distance perception, disorientation and discomfort of the user (e.g., motion sickness), and poor hand-eye coordination, e.g., while interacting with the physical environment. Thus, in various implementations, images from the scene camera are transformed such that they appear to have been captured at the location of the user's eyes using a depth map representing, for each pixel of the image, the distance from the camera to the object represented by the pixel. In various implementations, images from the scene camera are partially transformed such that they appear to have been captured at a location closer to the location of the user's eyes than the location of the scene camera in one or more dimensions.

In various implementations, the depth map is altered to reduce artifacts. For example, in various implementations, the depth map is smoothed so as to avoid holes in the transformed image. In various implementations, the depth map is clamped so as to reduce larger movements of the pixels during the transformation. In various implementations, the depth map is made static such that dynamic objects do not contribute to the depth map. For example, in various implementations, the depth map values at locations of a dynamic object are determined by interpolating the depth map using locations surrounding the locations of the dynamic object. In various implementations, the depth map values at locations of a dynamic object are determined based on depth map values determined at a time the dynamic object is not at the location. In various implementations, the depth map is determined using a three-dimensional model of the physical environment without dynamic objects. Using a static depth map may increase spatial artifacts, such as the objects not being displayed at their true locations. However, using a static depth map may reduce temporal artifacts, such as flickering.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 12. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 13.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
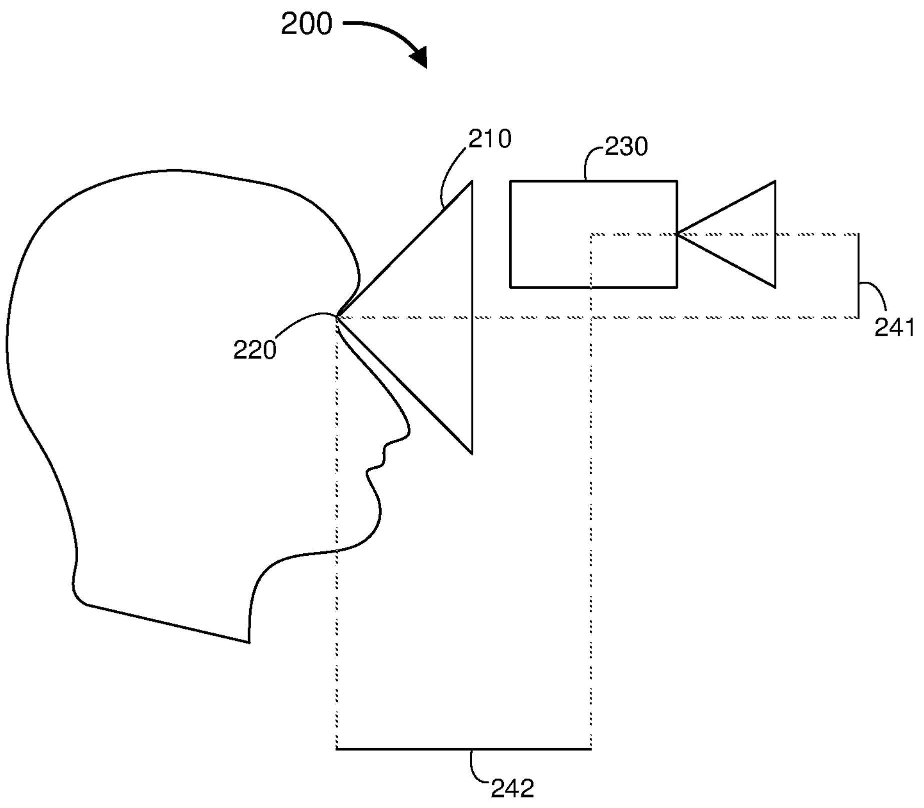
FIG. 2 illustrates an example scenario related to capturing an image of physical environment and displaying the captured image in accordance with some implementations.

FIG. 2 illustrates an example scenario 200 related to capturing an image of an environment and displaying the captured image in accordance with some implementations. A user wears a device (e.g., the electronic device 120 of FIG. 1) including a display 210 and an image sensor 230. The image sensor 230 captures an image of a physical environment and the display 210 displays the image of the physical environment to the eyes 220 of the user. The image sensor 230 has a perspective that is offset vertically from the perspective of the user (e.g., where the eyes 220 of the user are located) by a vertical offset 241. Further, the perspective of the image sensor 230 is offset longitudinally from the perspective of the user by a longitudinal offset 242. Further, in various implementations, the perspective of the image sensor 230 is offset laterally from the perspective of the user by a lateral offset (e.g., into or out of the page in FIG. 2).

Figure 3:
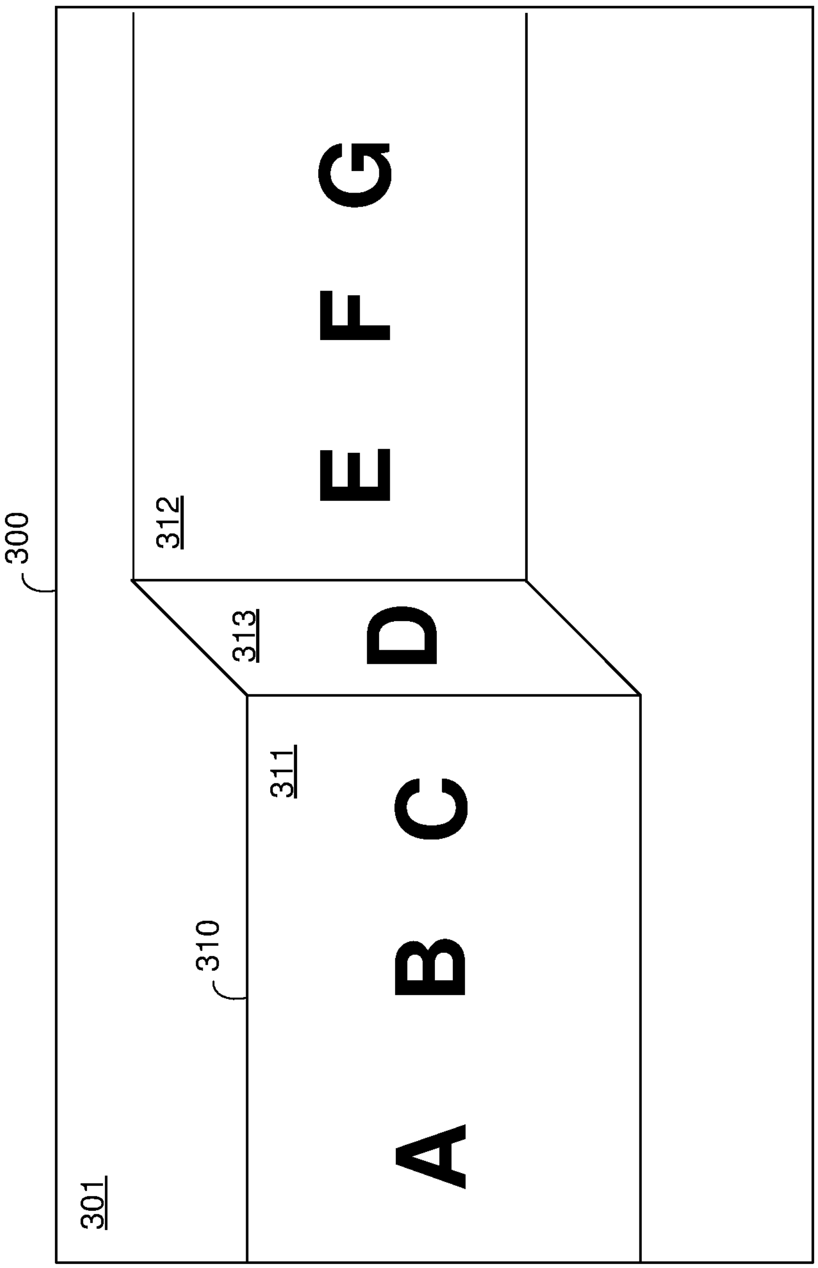
FIG. 3 is an image of physical environment captured by an image sensor from a particular perspective.

FIG. 3 is an image 300 of a physical environment 301 captured by an image sensor from a particular perspective. The physical environment 301 includes a structure 310 having a first surface 311 nearer to the image sensor, a second surface 312 further from the image sensor, and a third surface 313 connecting the first surface 311 and the second surface 312. The first surface 311 has the letters A, B, and C painted thereon, the third surface 313 has the letter D painted thereon, and the second surface 312 has the letters E, F, and G painted thereon.

From the particular perspective, the image 300 includes all of the letters painted on the structure 310. However, from other perspectives, as described below, a captured image may not include all the letters painted on the structure 310.

Figure 4:
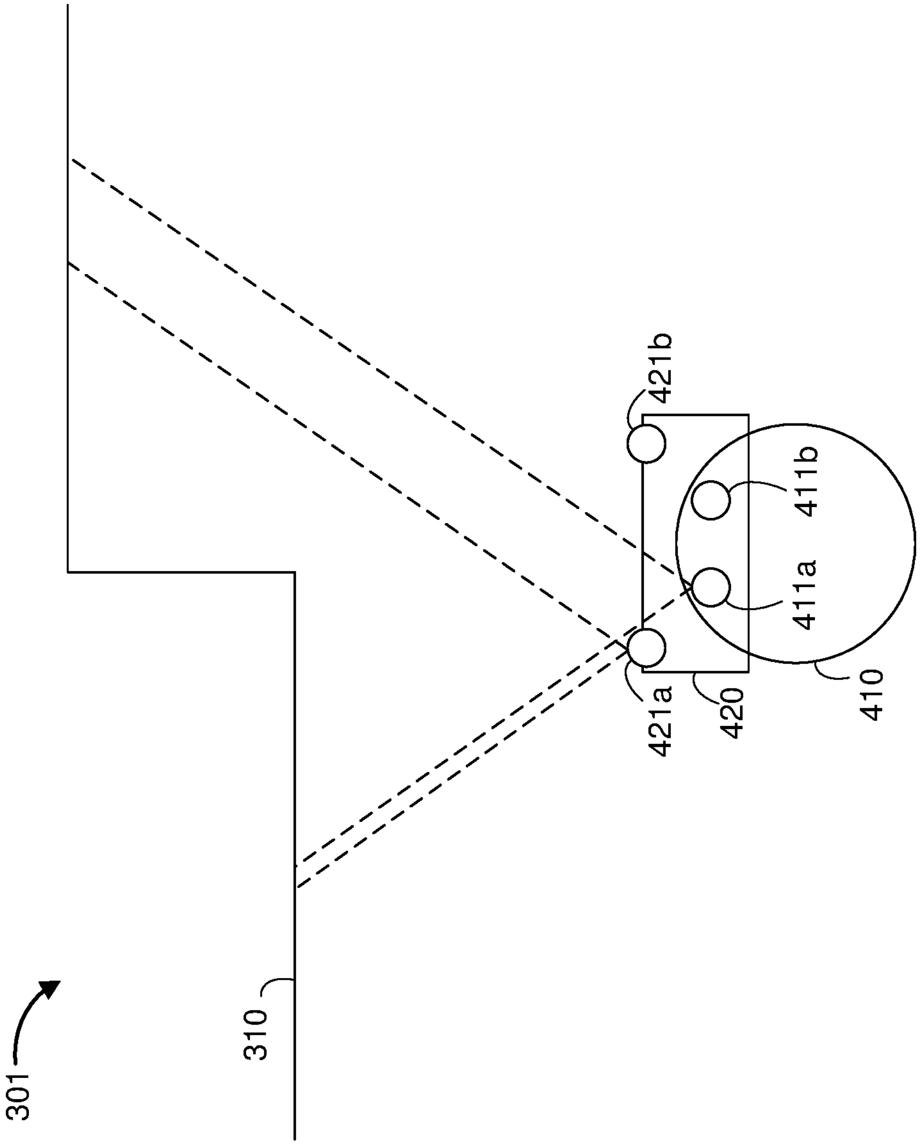
FIG. 4 is an overhead perspective view of the physical environment of FIG. 3.

FIG. 4 is an overhead perspective view of the physical environment 301 of FIG. 3. The physical environment 301 includes the structure 310 and a user 410 wearing an HMD 420. The user 410 has a left eye 411*a* at a left eye location providing a left eye perspective. The user 410 has a right eye 411*b* at a right eye location providing a right eye perspective. The HMD 420 includes a left image sensor 421*a* at a left image sensor location providing a left image sensor perspective. The HMD 420 includes a right image sensor 421*b* at a right image sensor location providing a right image sensor perspective. Because the left eye 411*a* of the user 410 and the left image sensor 421*a* of the HMD 420 are at different locations, they each provide different perspectives of the physical environment.

Figure 5A:
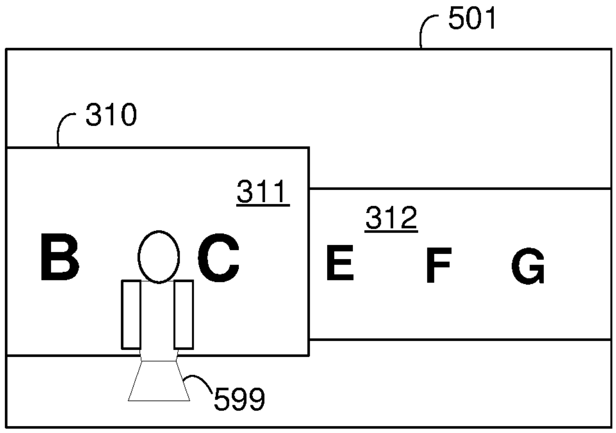
FIG. 5A illustrates a first view of the physical environment of FIG. 3 at a first time as would be seen by a left eye of a user if the user were not wearing an HMD.

FIG. 5A illustrates a first view 501 of the physical environment 301 at a first time as would be seen by the left eye 411*a* of the user 410 if the user 410 were not wearing the HMD 420. In the first view 501, the first surface 311 and the second surface 312 are present, but the third surface 313 is not. On the first surface 311, the letters B and C can be seen, whereas the letter A is not in the field-of-view of the left eye 411*a*. Similarly, on the second surface 312, the letters E, F, and G can be seen. The view 501 further includes a person 599 in front of the first surface 311 between the letters B and C.

Figure 5B:
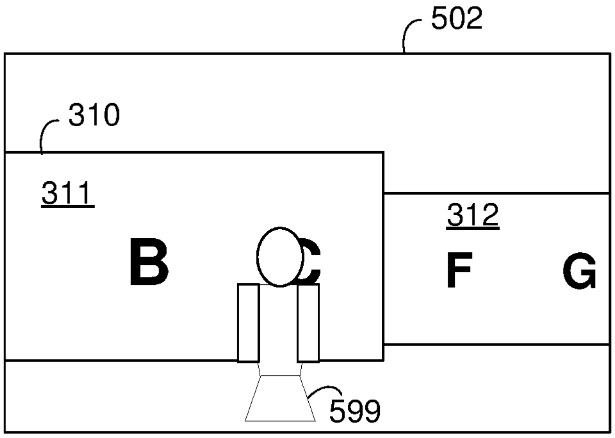
FIG. 5B illustrates a first image of the physical environment of FIG. 3 captured by a left image sensor of the HMD at the first time.

FIG. 5B illustrates a first image 502 of the physical environment 301 captured by the left image sensor 421*a* at the first time. In the first image 502, like the first view 501, the first surface 311 and the second surface 312 are present, but the third surface 313 is not. On the first surface 311, the letters B and C can be at least partially seen, whereas the letter A is not in the field-of-view of the left image sensor 421*a*. Similarly, on the second surface 312, the letters F and G can be seen, whereas the letter E is not in the field-of-view of the left image sensor 421*a*. Notably, in the first image 502, as compared to the first view 501, the letter E is not present on the second surface 312. Thus, the letter E is in the field-of-view of the left eye 411*a*, but not in the field-of-view of the left image sensor 421*a*. The first image 502 further includes the person 599 in front of the first surface 311 partially occluding the letter C.

In various implementations, the HMD 420 transforms the first image 502 to make it appear as though it was captured from the left eye perspective rather than the left image sensor perspective, e.g., to appear as the first view 501. In various implementations, the transformation is a projective transformation. In various implementations, the HMD 420 transforms the first image 502 based on depth values associated with first image 502 and a difference between the left image sensor perspective and the left eye perspective. In various implementations, the difference between the left image sensor perspective and the left eye perspective is determined during a calibration procedure. In various implementations, the depth value for a pixel of the first image 502 represents the distance from the left image sensor 421*a* to an object in the physical environment 301 represented by the pixel. In various implementations, the depth values are used to generate a depth map including a respective depth value for each pixel of the first image 502.

In various implementations, the resulting transformed image includes holes, e.g., pixel locations of the transformed image for which there is no corresponding pixel location of the first image 502. Such holes may be filled via interpolation or using additional images, such as another image from a different perspective (e.g., from the right image sensor 421*b* or from the left image sensor 421*a* at a different time).

In various implementations, the resulting transformed image includes ambiguities, e.g., pixel locations of the transformed image for where there are multiple corresponding pixel locations of the first image 502. Such ambiguities may be disambiguated using averaging or consensus algorithms.

In various implementations, the depth map excludes dynamic objects and/or includes only static objects. In various implementations, the depth map excludes movable objects and/or includes only fixed objects. In various implementations, the depth map excludes temporary objects and/or includes only permanent objects. Thus, in various implementations, the depth map excludes the person 599. For each pixel location representing the person 599 in the first image 502, the depth value is determined by ignoring the distance from the left image sensor 421*a* to the person 599. Rather, the depth value represents the distance from the left image sensor 421*a* to a static object behind the person 599. In various implementations, the depth value is determined by interpolating the depth values of pixels surrounding the pixel location representing the person 599. In various implementations, the depth value is determined based on depth values of the pixel location at a time the person 599 is not at the pixel location. In various implementations, the depth value is determined using a three-dimensional model of the physical environment 301 excluding the person 599.

For example, in various implementations, the HMD 420 generates a three-dimensional model including a three-dimensional mesh. The three-dimensional mesh includes a set of triangles that are connected by their common edges and/or vertices. Each vertex is located at a three-dimensional location in a three-dimensional coordinate system of the physical environment 301. To generate the three-dimensional model, the HMD 420 determines the three-dimensional locations of the vertices using a depth sensor, stereo matching, or any other method. However, in various implementations, a vertex is added only if it is determined that the corresponding object is a static object. For example, when using a depth sensor, a vertex may only be added if it is detected at least a threshold number of times over a time period of sufficient length. As another example, using stereo matching, a vertex may only be added if the pixels in the stereo images correspond to a static object in the images as determined via semantic segmentation. For example, in a first image of the physical environment and a second image of the physical environment, each pixel may be classified as one of a plurality of object types using a neural network. For a pixel in the first image classified as a wall or a table and a corresponding pixel in the second image similarly classified, a vertex corresponding to the pixels may be added to the three-dimensional model. For a pixel in the first image classified as a person, a hand, a dog, or a vehicle and a corresponding pixel in the second image similarly classified, a vertex corresponding to the pixels may not be added to the three-dimensional model.

Using a static depth map may increase spatial artifacts, such as the person 599 not being displayed at its true location in the physical environment 301. However, using a static depth map may reduce temporal artifacts, such as flickering or warping. Further, another advantage of generating a depth map using a three-dimensional model is that a static depth map can be rendered from any viewpoint where the room geometry is visible.

Figure 6A:
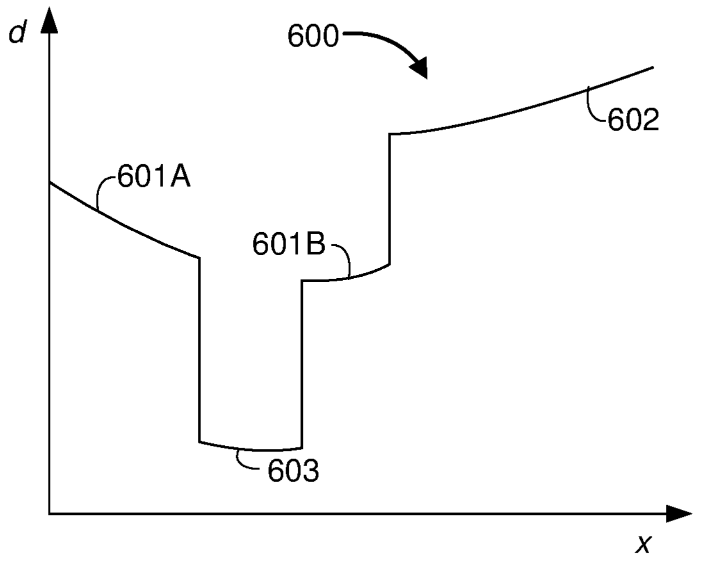
FIG. 6A illustrates a first depth plot for a central row of a first depth map of the first image of FIG. 5B.

FIG. 6A illustrates a first depth plot 600 for a central row of a first depth map of the first image 502. The first depth plot 600 includes a left first portion 601A corresponding to the distance between the left image sensor 421A and various points on the first surface 311 to the left of the person 599 and a right first portion 601B corresponding to the distance between the left image sensor 421A and various points on the first surface 311 to the right of the person 599. The first depth plot 600 includes a second portion 602 corresponding to the distance between the left image sensor 421A and various points on the second surface 312. The first depth plot 600 includes a third portion 603 corresponding to the distance between the left image sensor 421A and various points on the person 599.

Figure 6B:
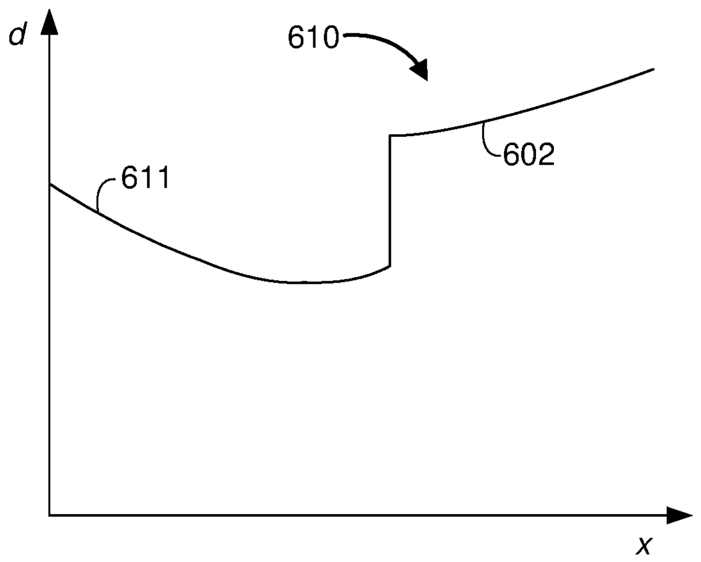
FIG. 6B illustrates a first static depth plot for the central row of a first static depth map of the first image of FIG. 5B.

FIG. 6B illustrates a first static depth plot 610 for a central row of a first static depth map of the first image 502. In various implementations, the first static depth map is generated by rasterization of the three-dimensional model or ray tracing based on the three-dimensional model. Thus, each pixel in the static depth map indicates the distance from the left image sensor 421A to a static object in the physical environment 301 through the pixel of the first image 502 in a camera plane.

The first static depth plot 610 includes a first portion 611 corresponding to the distance between the left image sensor 421A and various points on the first surface 311 and the second portion 602 corresponding to the distance between the left image sensor 421A and various points on the second surface 312. Notably, the first static depth plot 610 does not include the third portion 603 corresponding to the distance the left image sensor 421A and various points on the person 599 because the person 599 is not a static object.

Figure 7A:
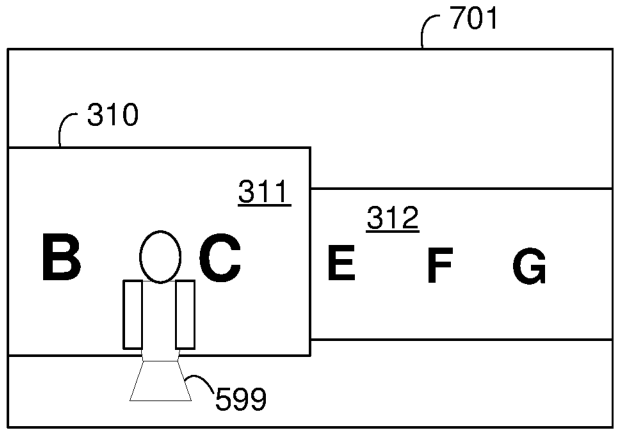
FIG. 7A illustrates a first transformed first image based on the first image of FIG. 5B and the first depth plot of FIG. 6A.

FIG. 7A illustrates a first transformed first image 701 generated by transforming the first image 502 based on the first depth map of the first image 502 and the difference between the left scene camera perspective and the left eye perspective.

In the first transformed first image 701, the first surface 311 and the second surface 312 are present, but the third surface 313 is not. On the first surface 311, the letters B and C can be seen. Similarly, on the second surface 312, the letters E, F, and G can be seen. The first transformed first image 701 further includes the person 599 in front of the first surface 311 between the letters B and C. Thus, the first transformed first image 701 is substantially identical to the first view 501. Although, the left-half of the letter C and the entirety of the letter E was not seen in the first image 502, the left-half of the letter C and the entirety of the letter E is seen in the first transformed first image 701 using hole-filling using other images (rather than interpolation).

Figure 7B:
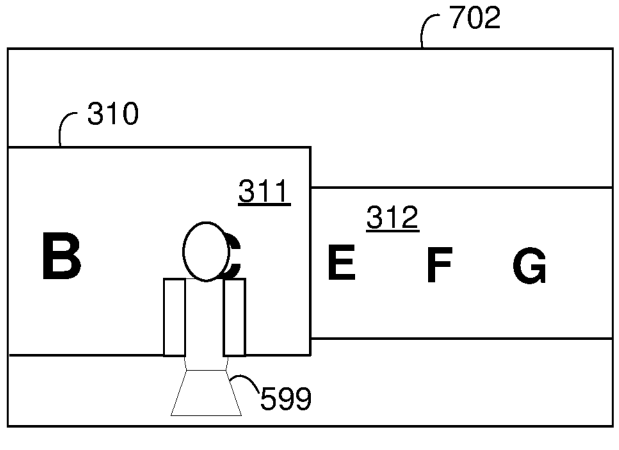
FIG. 7B illustrates a second transformed first image based on the first image of FIG. 5B and the static depth plot of FIG. 6B.

FIG. 7B illustrates a second transformed first image 702 generated by transforming the first image 502 based on the first static depth map of the first image 502 and the difference between the left scene camera perspective and the left eye perspective.

In the second transformed first image 701, the first surface 311 and the second surface 312 are present, but the third surface 313 is not. On the first surface 311, the letters B and C can be at least partially seen. Similarly, on the second surface 312, the letters E, F, and G can be seen. The second transformed first image 701 further includes the person 599 in front of the first surface 311 partially occluding the letter C. Thus, whereas the first surface 311 and second surface 312 are correctly transformed, with the letters having the same sizes and positions as the first view 501, the person 599 is not between the letters B and C (as in the first view 501), but partially occluding the letter C (as in the first image 502). Transforming based on the first static depth map treats the person 599 as though the person 599 were at the depth of the first surface 311 (e.g., painted on the first surface 311) rather than in front of the first surface 311. Thus, the portion of the first image 502 corresponding to the person 599 is mapped to the same location as the portion of the first image corresponding to the letter C. Although the letter E was not seen in the first image 502, the letter E is seen in the second transformed first image 702 using hole-filling using other images (rather than interpolation).

Figure 8A:
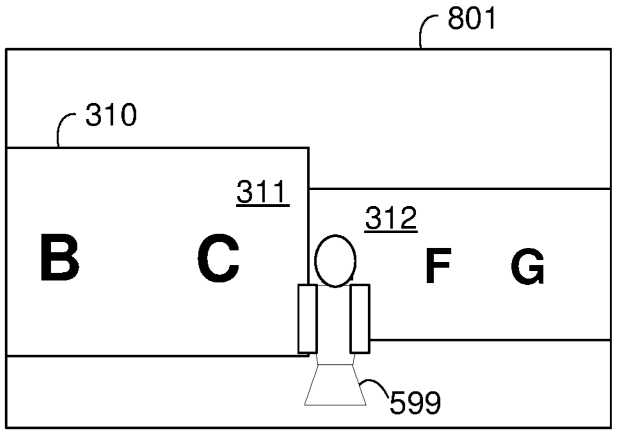
FIG. 8A illustrates a second view of the physical environment of FIG. 3 at a second time as would be seen by the left eye of the user if the user were not wearing the HMD.

FIG. 8A illustrates a second view 801 of the physical environment 301 at a second time subsequent to the first time as would be seen by the left eye 411*a* of the user 410 if the user 410 were not wearing the HMD 420. In the second view 801, the first surface 311 and the second surface 312 are present, but the third surface 313 is not. On the first surface 311, the letters B and C can be seen, whereas the letter A is not in the field-of-view of the left eye 411*a*. Similarly, on the second surface 312, the letters E, F, and G can be seen. The second view 801 further includes the person 599 having moved in front of the second surface 312 occluding the letter E.

Figure 8B:
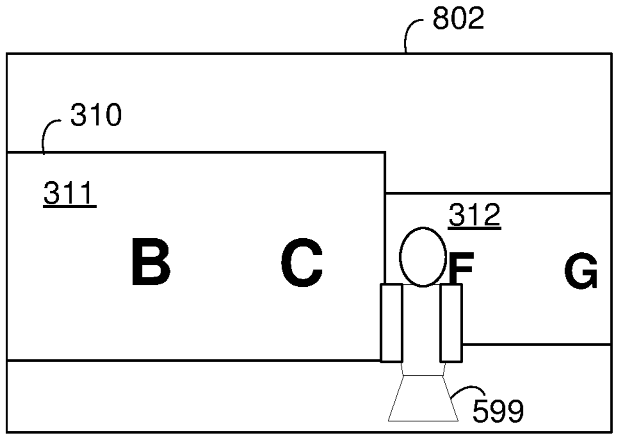
FIG. 8B illustrates a second image of the physical environment of FIG. 3 captured by a left image sensor of the HMD at the second time.

FIG. 8B illustrates a second image 802 of the physical environment 301 captured by the left image sensor 421*a* at the second time. In the second image 802, like the second view 801, the first surface 311 of the structure 310 and the second surface 312 of the structure 310 are present, but the third surface 313 is not. On the first surface 311, the letters B and C can be seen, whereas the letter A is not in the field-of-view of the left image sensor 421*a*. Similarly, on the second surface 312, the letters F and G can be at least partially seen, whereas the letter E is not in the field-of-view of the left image sensor 421*a*. The second image 802 further includes the person 599 in front of the first surface 311 partially occluding the letter F.

In various implementations, the HMD 420 transforms the second image 802 to make it appear as though it was captured from the left eye perspective rather than the left image sensor perspective, e.g., to appear as the second view 801. In various implementations, the HMD 420 transforms the second image 802 based on depth values associated with second image 802 and the difference between the left image sensor perspective and the left eye perspective. In various implementations, the depth values are used to generate a depth map including a respective depth value for each pixel of the second image 802.

Figure 9A:
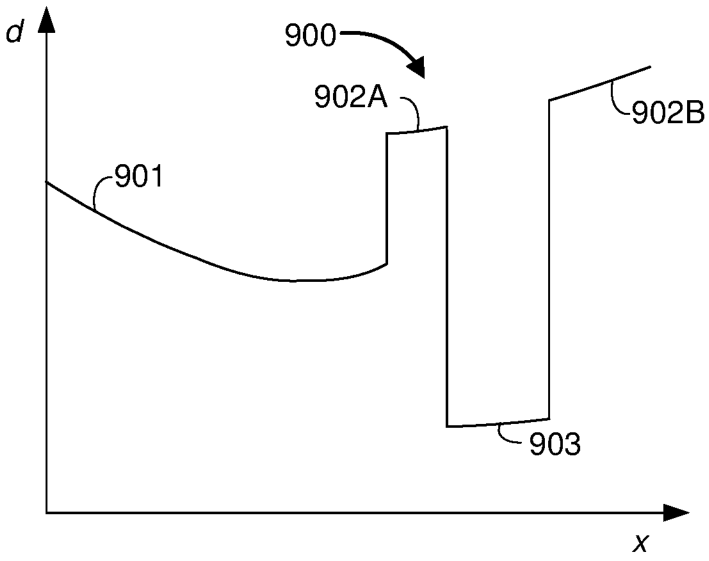
FIG. 9A illustrates a second depth plot for a central row of a second depth map of the second image of FIG. 8B.

FIG. 9A illustrates a second depth plot 900 for a central row of a second depth map of the second image 802. The second depth plot 900 includes a first portion 901 corresponding to the distance between the left image sensor 421A and various points on the first surface 311. The second depth plot 900 includes a left second portion 902A corresponding to the distance between the left image sensor 421A and various points on the second surface 312 to the left of the person 599 and a right second portion 902B corresponding to the distance between the left image sensor 421A and various points on the second surface 312 to the right of the person 599. The second depth plot 900 includes a third portion 903 corresponding to the distance between the left image sensor 421A and various points on the person 599.

Figure 9B:
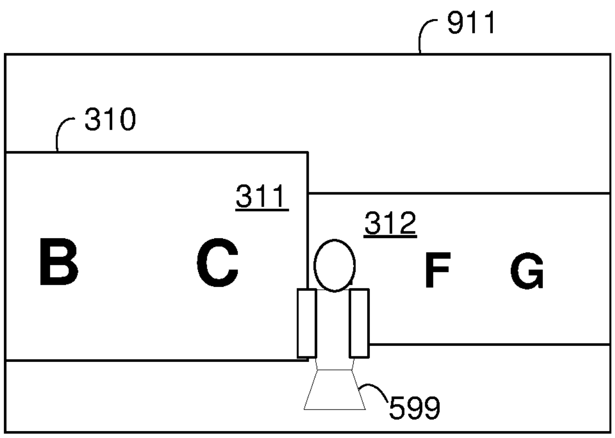
FIG. 9B illustrates a first transformed second image based on the second image of FIG. 8B and the second depth plot of FIG. 9A.

FIG. 9B illustrates a first transformed second image 911 generated by transforming the second image 802 based on the second depth map of the second image 802 and the difference between the left scene camera perspective and the left eye perspective.

In the first transformed second image 911, the first surface 311 and the second surface 312 are present, but the third surface 313 is not. On the first surface 311, the letters B and C can be seen. Similarly, on the second surface 312, the F and G can be seen. The first transformed second image 911 further includes the person 599 in front of the second surface 312 occluding the letter E. Thus, the first transformed second image 911 is substantially identical to the second view 801. Although, a portion of the letter F was not seen in the second image 802, the entirety of the letter F is seen in the first transformed second image 911 using hole-filling using other images (rather than interpolation).

In various implementations, generating a depth map can be time-consuming. Thus, at the second time, the second depth map may be unavailable, incomplete, or inaccurate. For example, at the second time, only the first depth map (corresponding to the first time) may be available.

Figure 10A:
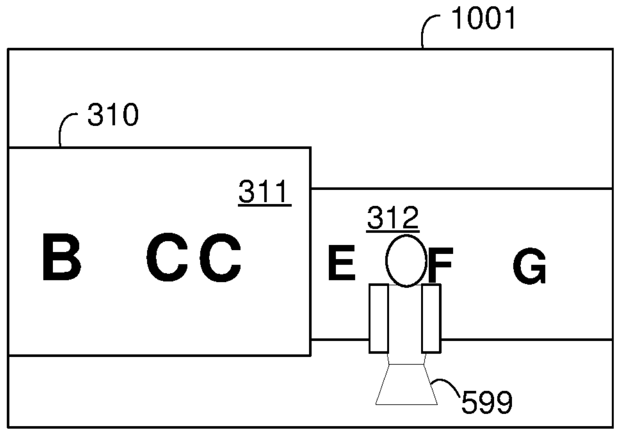
FIG. 10A illustrates a second transformed second image based on the second image of FIG. 8B and the first depth plot of FIG. 6A.

FIG. 10A illustrates a second transformed second image 1001 generated by transforming the second image 802 based on the first depth map of the first image 502 and the difference between the left scene camera perspective and the left eye perspective.

In the second transformed second image 1001, the first surface 311 and the second surface 312 are present, but the third surface 313 is not. On the first surface 311, the letter B and two instances of the letter C can be seen. The first instance (on the left) results from mapping the letter C in the second image 802 to a new location based on the first depth map. The second instance (on the right) results from hole-filling a hole generated by transforming based on the first depth map in which the person 599 was in front of the letter C.

On the second surface 312, the letters E, F, and G can be at least partially seen. The second transformed second image 1001 further includes the person 599 partially occluding the letter F as in the second image 802.

Thus, in the second transformed second image 1001, as compared to the second view 801, the person 599 is at the wrong location and a second instance of the letter C is introduced between the letters B and C. To avoid artifacts, such as the duplicate letter C or warping around dynamic objects, a static depth map may be used. Because the perspective of the first image 502 and the second image 802 are the same, a second static depth map for the second image 802 is identical to the first static depth map for the first image 502 having the first static depth plot 610 illustrated in FIG. 6B.

Figure 10B:
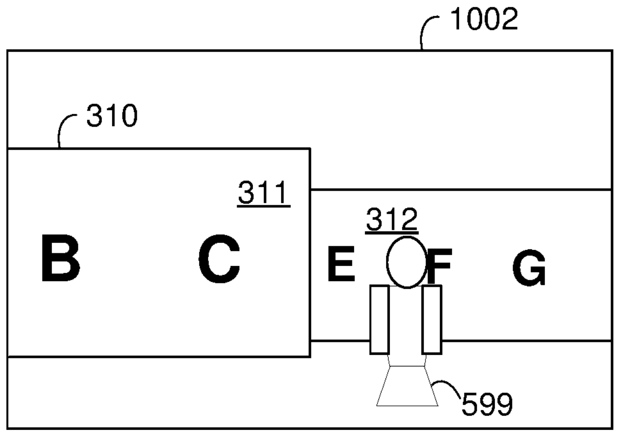
FIG. 10B illustrates a third transformed second image based on the second image of FIG. 8B and the first static depth plot of FIG. 6B.

FIG. 10B illustrates a third transformed second image 1002 generated by transforming the second image 802 based on the second static depth map of the second image 802 and the difference between the left scene camera perspective and the left eye perspective.

In the third transformed second image 1002, the first surface 311 and the second surface 312 are present, but the third surface 313 is not. On the first surface 311, the letters B and C can be seen. Similarly, on the second surface 312, the letters E, F, and G can be at least partially seen. The third transformed second image 1002 further includes the person 599 in front of the second surface 311 partially occluding the letter F. Thus, whereas the first surface 311 and second surface 312 are correctly transformed, with the letters having the same sizes in the third transformed second image 1002 and the second view 801, the person 599 is not occluding the letter E (as in the second view 801), but partially occluding the letter F (as in the second image 802). The third transformed second image 1002 treats the person 599 as though the person 599 were at the depth of the second surface 312 (e.g., painted on the second surface 312) rather than in front of the second surface 312. Thus, the portion of the second image 802 corresponding to the person 599 is mapped to the same location as the portion of the second image 802 corresponding to the letter F. Although the letter E was not seen in the second image 802, the letter E is seen in the third transformed second image 1002 using hole-filling using images at other perspectives (rather than interpolation).

Figure 11:
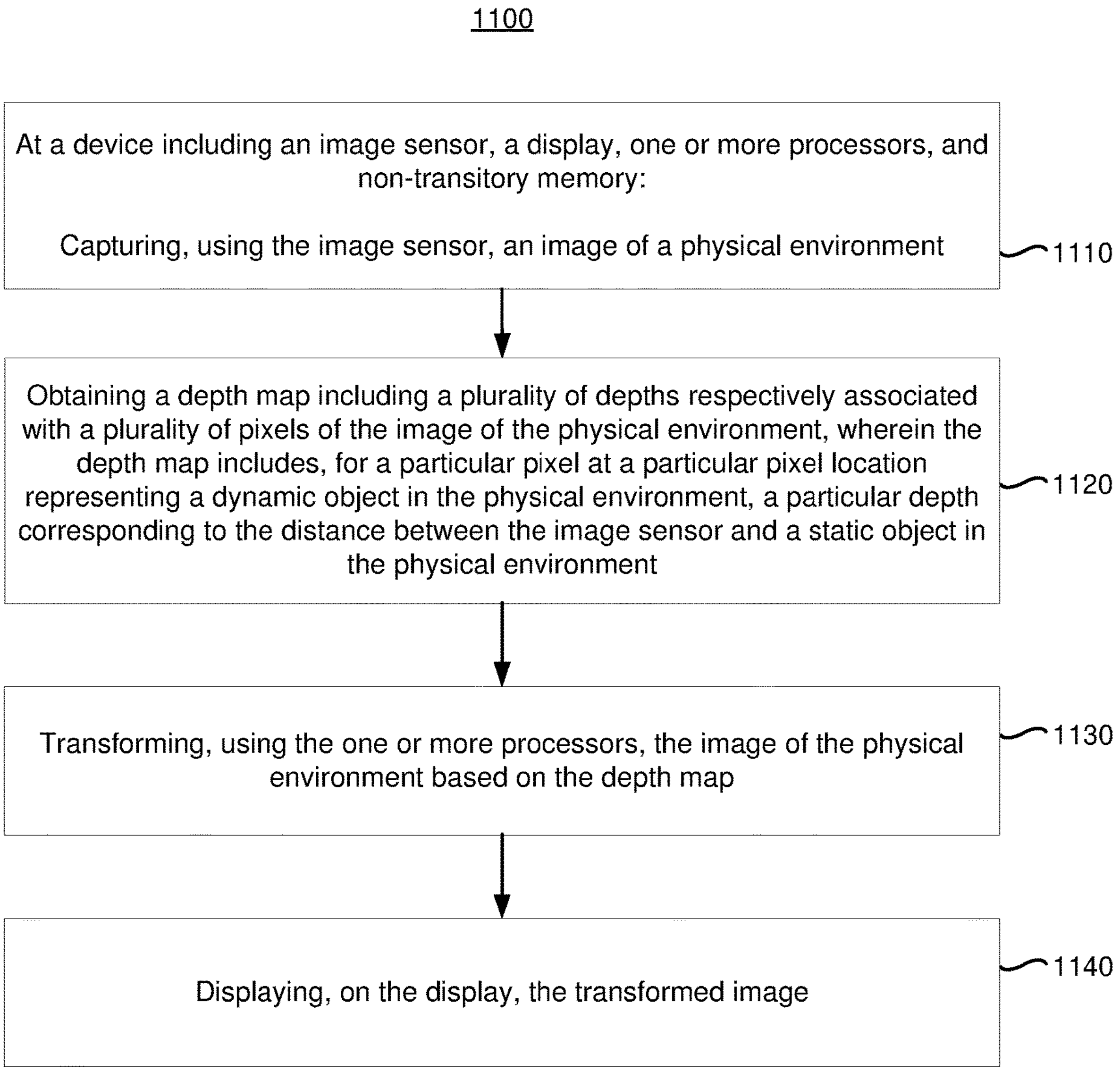
FIG. 11 is a flowchart representation of a method of performing perspective correction in accordance with some implementations.

FIG. 11 is a flowchart representation of a method of performing perspective correction of an image in accordance with some implementations. In various implementations, the method 1100 is performed by a device with an image sensor, a display, one or more processors, and non-transitory memory (e.g., the electronic device 100 of FIG. 1). In some implementations, the method 1100 is performed by processing logic, including hardware, firmware, software, or a combination thereof. In some implementations, the method 1100 is performed by a processor executing instructions (e.g., code) stored in a non-transitory computer-readable medium (e.g., a memory).

The method 1100 begins, in block 1110, with the device capturing, using the image sensor, an image of a physical environment.

The method 1100 continues, in block 1120, with the device obtaining a depth map including a plurality of depths respectively associated with a plurality of pixels of the image of the physical environment, wherein the depth map includes, for a particular pixel at a particular pixel location representing a dynamic object in the physical environment, a particular depth corresponding to a distance between the image sensor and the a static object in the physical environment behind the dynamic object.

In various implementations, the depth map includes a dense depth map which represents, for each pixel of the image, an estimated distance between the image sensor and a static object represented by the pixel or behind a dynamic object represented by the pixel. In various implementations, the depth map includes a sparse depth map which represents, for each of a subset of the pixels of the image, an estimated distance between the image sensor and a static object represented by the pixel or behind a dynamic object represented by the pixel. In various implementations, the device generates a sparse depth map from a dense depth map by sampling the dense depth map, e.g., selecting a single pixel in every N×N block of pixels.

In various implementations, the device obtains at least one of the plurality of depths from a depth sensor. In various implementations, the device obtains at least one of the plurality of depths using stereo matching, e.g., using the image of the physical environment as captured by a left scene camera and another image of the physical environment captured by a right scene camera. In various implementations, the device obtains the plurality of depths through eye tracking, e.g., the intersection of the gaze directions of the two eyes of the user indicates the depth of an object at which the user is looking. In various implementations, as discussed further below, the device obtains the plurality of depths based on a three-dimensional model of the physical environment excluding dynamic objects.

In various implementations, obtaining the depth map includes determining the particular depth via interpolation using depths of locations surrounding the particular pixel. For example, in various implementations, to generate the first portion 611 of the static depth plot 610 of FIG. 6B, the HMD 420 interpolates between the left first portion 601*a* and the right first portion 601*b* of the first depth plot 600 of FIG. 6B.

In various implementations, obtaining the depth map includes determining the particular depth at a time the dynamic object was not represented at the pixel location. For example, in various implementations, to generate the right portion for the second static depth plot (which looks identical to the first static depth plot 610 of FIG. 6B), the HMD 420 uses the right portion 602 of the first depth plot 600 of FIG. 6A when the person 599 was not at the right portion. In various implementations, the method 1100 includes obtaining a three-dimensional model of the physical environment excluding the dynamic object. In various implementations, the method 1100 includes obtaining a three-dimensional model of the physical environment based on objects in the physical environment determined to be static. In various implementations, obtaining the three-dimensional model includes retrieving the three-dimensional model from a non-transitory memory either of the device or remote from the device. In various implementations, obtaining the three-dimensional model includes generating the three-dimensional model.

In various implementations, generating the three-dimensional model includes adding one or more points to the three-dimensional model at one or more location in a three-dimensional coordinate system of the physical environment corresponding to one or more static objects in the physical environment. In various implementations, the one or more points are vertices of triangles of a mesh. In various implementations, adding the one or more points to the three-dimensional model includes (and/or is performed in response to) determining that the one or more points correspond to the one or more static objects in the physical environment.

In various implementations, determining that a particular one of the one or more points corresponds to the one or more static objects includes performing semantic segmentation on one or more images. For example, a pixel classified as a table or a wall could form part of a keypoint pair in stereo matching to generate a point to be added to the three-dimensional model, whereas a pixel classified as a person or a vehicle would be excluded from forming part of a keypoint pair in stereo matching to generate a point to be added to the three-dimensional model. In various implementations, determining that a particular one of the one or more points corresponds to the one or more static objects includes detecting the particular point at a same location at least a threshold number of times over a time period. For example, if a feature is detected at the same location in the physical environment in two or more subsequent days, a point determined to correspond to a static object is added at that location. In various implementations, determining that a particular one of the one or more points corresponds to the one or more static objects includes determining that surrounding points correspond to the one or more static objects. For example, if points of a wall are detected in three non-linear co-planar locations, points on the defined plane between the points can be determined as points corresponding to the one or more static objects.

Thus, in various implementations, the three-dimensional model is based on historical data obtained at one or more times before the image of the physical environment was captured. For example, the three-dimensional model may be based on a data obtained a second, a few seconds, a minute, a few minutes, an hour, a day, or any other time before the image of the physical environment was captured.

In various implementations, determining the particular depth based on the three-dimensional model includes rasterizing the three-dimensional model. In various implementations, determining the particular depth based on the three-dimensional model includes ray tracing based on the three-dimensional model.

In various implementations, obtaining the depth map includes obtaining a temporally stable depth map that includes depths based on distances between the image sensor and static objects and excludes depths based on distances between the image sensor and dynamic objects.

The method 1100 continues, in block 1130, with the device transforming, using the one or more processors, the image of the physical environment based on the depth map. In various implementations, the device transforms the image of the physical environment at an image pixel level, an image tile level, or a combination thereof.

In various implementations, the device transforms the image of the physical environment based on a difference between a first perspective of the image sensor and a second perspective. In various implementations, the second perspective is the perspective of a user, e.g., the perspective of an eye of the user. In various implementations, the second perspective is a perspective of a location closer to the eye of the user in one or more directions.

In various implementations, the device performs a projective transformation based on the depth map and the difference between the first perspective of the image sensor and the second perspective.

In various implementations, the projective transformation is a forward mapping in which, for each pixel of the image of the physical environment at a pixel location in an untransformed space, a new pixel location is determined in a transformed space of the transformed image. In various implementations, the projective transformation is a backwards mapping in which, for each pixel of the transformed image at a pixel location in a transformed space, a source pixel location is determined in an untransformed space of the image of the physical environment.

In various implementations, the source pixel location is determined according to the following equation in which $x_1$ and $y_1$ are the pixel location in the untransformed space, $x_2$ and $y_2$ are the pixel location in the transformed space, $P_2$ is a 4×4 view projection matrix of the second perspective, $P_1$ is a 4×4 view projection matrix of the first perspective of the image sensor, and d is the depth map value at the pixel location:

$$\begin{bmatrix} x_1 \\ y_1 \\ 1 \end{bmatrix} \leftarrow P_1 \cdot P_2^{-1} \cdot \begin{bmatrix} x_2 \\ y_2 \\ 1 \\ \left(\frac{1}{d}\right) \end{bmatrix}$$

In various implementations, the source pixel location is determined using the above equation for each pixel in the image of the physical environment. In various implementations, the source pixel location is determined using the above equation for less than each pixel of the image of the physical environment.

In various implementations, the device determines the view projection matrix of the second perspective and the view projection matrix of the first perspective during a calibration and stores data indicative of the view projection matrices (or their product) in a non-transitory memory. The product of the view projection matrices is a transformation matrix that represents a difference between the first perspective of the image sensor and the second perspective.

Thus, in various implementations, transforming the image of the physical environment includes determining, for a plurality of pixels of the transformed image having respective pixel locations, a respective plurality of source pixel locations. In various implementations, determining the respective plurality of source pixel locations includes, for each of the plurality of pixels of the transformed image, multiplying a vector including the respective pixel location and the multiplicative inverse of the respective element of the smooth depth map by a transformation matrix representing the difference between the first perspective of the image sensor and the second perspective.

Using the source pixel locations in the untransformed space and the pixel values of the pixels of the image of the physical environment, the device generates pixel values for each pixel location of the transformed image using interpolation or other techniques.

In various implementations, the device modifies the depth map before using the depth map to perform the transformation. For example, in various implementations, transforming the image of the physical environment based on the depth map further includes smoothing the depth map. For example, in various implementations, the device applies a two-dimensional low-pass filter to the depth map. As another example, in various implementations, transforming the image of the physical environment based on the depth map further includes clamping the depth map. For example, in various implementations, any value in the depth map that is below a clamping threshold is replaced with the clamping threshold.

The method 1100 continues, in block 1140, with the device displaying, on the display, the transformed image. In various implementations, the transformed image includes XR content. In some implementations, XR content is added to the current image of the physical environment before the transformation (at block 1130). In some implementations, XR content is added to the transformed image. In various implementations, the device determines whether to add the XR content to the image of the physical environment before or after the transformation based on metadata indicative of the XR content's attachment to the physical environment. In various implementations, the device determines whether to add the XR content to the image of the physical environment before or after the transformation based on an amount of XR content (e.g., a percentage of the image of the physical environment containing XR content).

In various implementations, the device determines whether to add the XR content to the image of the environment before or after the transformation based on metadata indicative of a depth of the XR content. Accordingly, in various implementations, the method 1100 includes receiving XR content and XR content metadata, selecting the image of the physical environment or the transformed image based on the XR content metadata, and adding the XR content to the selection.

Figure 12:
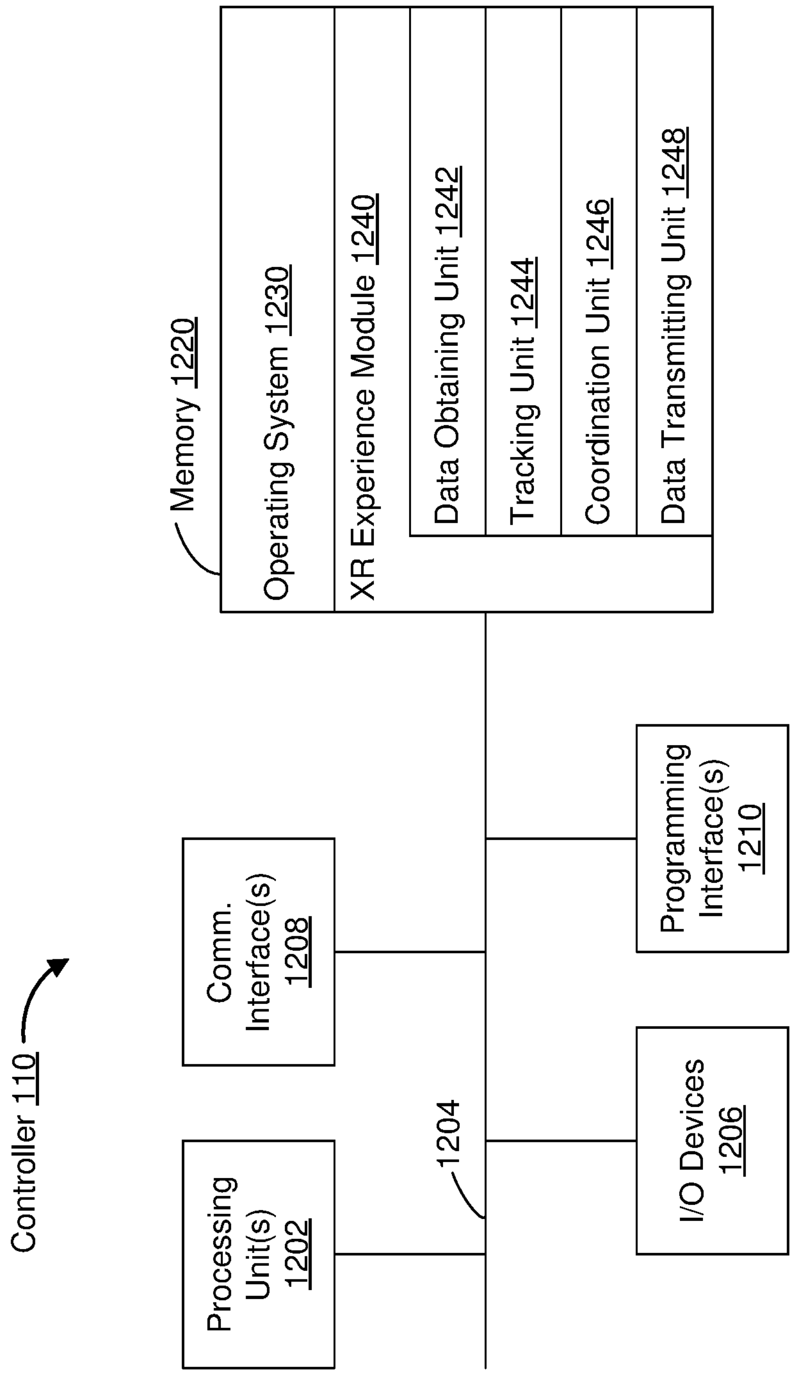
FIG. 12 is a block diagram of an example controller in accordance with some implementations.

FIG. 12 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 1202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 1206, one or more communication interfaces 1208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 1210, a memory 1220, and one or more communication buses 1204 for interconnecting these and various other components.

In some implementations, the one or more communication buses 1204 include circuitry that interconnects and controls communications between system components. In some implementations, the one or more I/O devices 1206 include at least one of a keyboard, a mouse, a touchpad, a joystick, one or more microphones, one or more speakers, one or more image sensors, one or more displays, and/or the like.

The memory 1220 includes high-speed random-access memory, such as dynamic random-access memory (DRAM), static random-access memory (SRAM), double-data-rate random-access memory (DDR RAM), or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium. In some implementations, the memory 1220 or the non-transitory computer readable storage medium of the memory 1220 stores the following programs, modules and data structures, or a subset thereof including an optional operating system 1230 and an XR experience module 1240.

The operating system 1230 includes procedures for handling various basic system services and for performing hardware dependent tasks. In some implementations, the XR experience module 1240 is configured to manage and coordinate one or more XR experiences for one or more users (e.g., a single XR experience for one or more users, or multiple XR experiences for respective groups of one or more users). To that end, in various implementations, the XR experience module 1240 includes a data obtaining unit 1242, a tracking unit 1244, a coordination unit 1246, and a data transmitting unit 1248.

In some implementations, the data obtaining unit 1242 is configured to obtain data (e.g., presentation data, interaction data, sensor data, location data, etc.) from at least the electronic device 120 of FIG. 1. To that end, in various implementations, the data obtaining unit 1242 includes instructions and/or logic therefor, and heuristics and metadata therefor.

In some implementations, the tracking unit 1244 is configured to map the physical environment 105 and to track the position/location of at least the electronic device 120 with respect to the physical environment 105 of FIG. 1. To that end, in various implementations, the tracking unit 1244 includes instructions and/or logic therefor, and heuristics and metadata therefor.

In some implementations, the coordination unit 1246 is configured to manage and coordinate the XR experience presented to the user by the electronic device 120. To that end, in various implementations, the coordination unit 1246 includes instructions and/or logic therefor, and heuristics and metadata therefor.

In some implementations, the data transmitting unit 1248 is configured to transmit data (e.g., presentation data, location data, etc.) to at least the electronic device 120. To that end, in various implementations, the data transmitting unit 1248 includes instructions and/or logic therefor, and heuristics and metadata therefor.

Although the data obtaining unit 1242, the tracking unit 1244, the coordination unit 1246, and the data transmitting unit 1248 are shown as residing on a single device (e.g., the controller 110), it should be understood that in other implementations, any combination of the data obtaining unit 1242, the tracking unit 1244, the coordination unit 1246, and the data transmitting unit 1248 may be located in separate computing devices.

Moreover, FIG. 12 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 13:
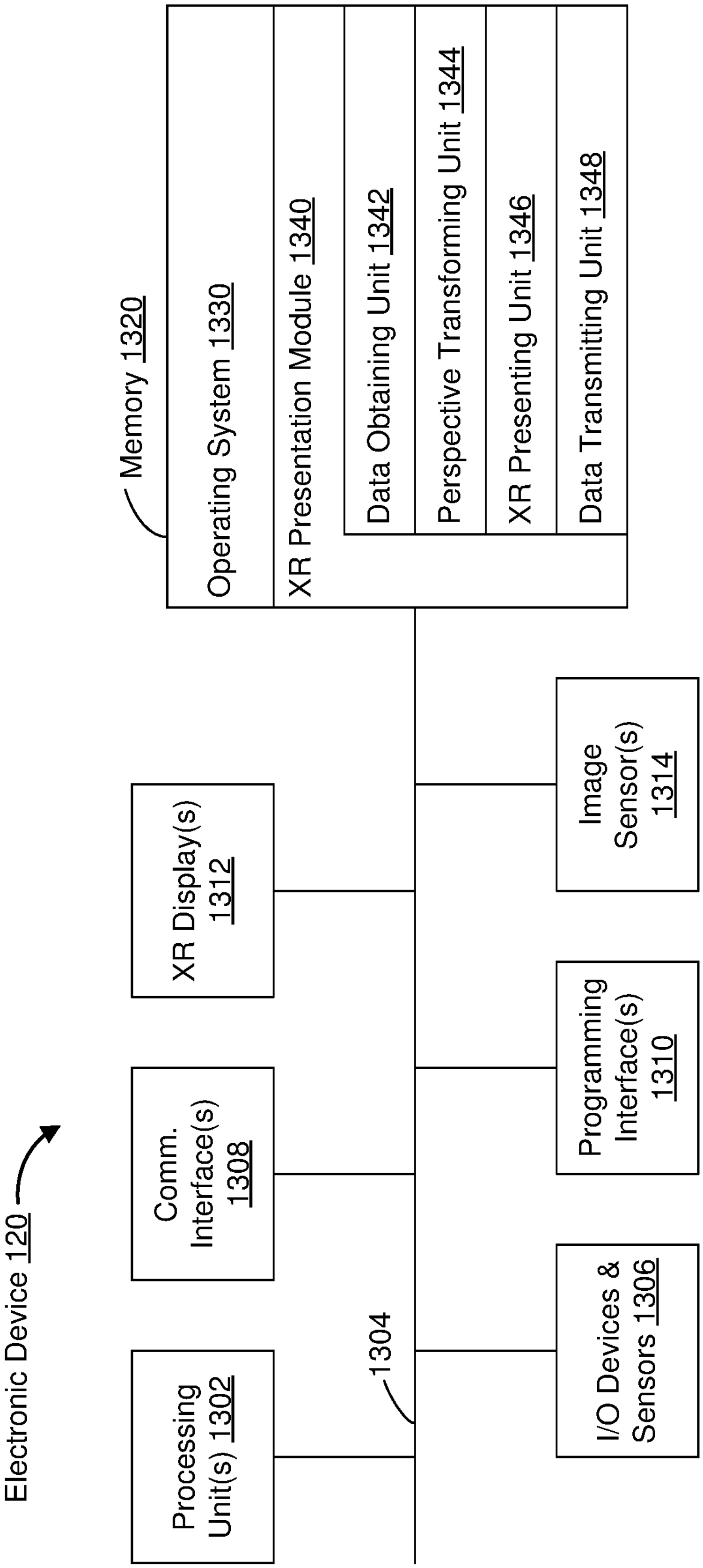
FIG. 13 is a block diagram of an example electronic device in accordance with some implementations.

FIG. 13 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 1302 (e.g., microprocessors, ASICs, FPGAs, GPUs, CPUs, processing cores, and/or the like), one or more input/output (I/O) devices and sensors 1306, one or more communication interfaces 1308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1310, one or more XR displays 1312, one or more optional interior- and/or exterior-facing image sensors 1314, a memory 1320, and one or more communication buses 1304 for interconnecting these and various other components.

In some implementations, the one or more communication buses 1304 include circuitry that interconnects and controls communications between system components. In some implementations, the one or more I/O devices and sensors 1306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1312 are configured to provide the XR experience to the user. In some implementations, the one or more XR displays 1312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 1312 are capable of presenting MR and VR content.

In some implementations, the one or more image sensors 1314 are configured to obtain image data that corresponds to at least a portion of the face of the user that includes the eyes of the user (any may be referred to as an eye-tracking camera). In some implementations, the one or more image sensors 1314 are configured to be forward-facing so as to obtain image data that corresponds to the physical environment as would be viewed by the user if the electronic device 120 was not present (and may be referred to as a scene camera). The one or more optional image sensors 1314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1320 includes high-speed random-access memory, such as DRAM, SRAM, DDR RAM, or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 comprises a non-transitory computer readable storage medium. In some implementations, the memory 1320 or the non-transitory computer readable storage medium of the memory 1320 stores the following programs, modules and data structures, or a subset thereof including an optional operating system 1330 and an XR presentation module 1340.

The operating system 1330 includes procedures for handling various basic system services and for performing hardware dependent tasks. In some implementations, the XR presentation module 1340 is configured to present XR content to the user via the one or more XR displays 1312. To that end, in various implementations, the XR presentation module 1340 includes a data obtaining unit 1342, a perspective transforming unit 1344, an XR presenting unit 1346, and a data transmitting unit 1348.

In some implementations, the data obtaining unit 1342 is configured to obtain data (e.g., presentation data, interaction data, sensor data, location data, etc.) from at least the controller 110 of FIG. 1. To that end, in various implementations, the data obtaining unit 1342 includes instructions and/or logic therefor, and heuristics and metadata therefor.

In some implementations, the perspective transforming unit 1344 is configured to perform perspective correction using a temporally stable depth map based on static objects (and not dynamic objects). To that end, in various implementations, the perspective transforming unit 1344 includes instructions and/or logic therefor, and heuristics and metadata therefor.

In some implementations, the XR presenting unit 1346 is configured to display the transformed image via the one or more XR displays 1312. To that end, in various implementations, the XR presenting unit 1346 includes instructions and/or logic therefor, and heuristics and metadata therefor.

In some implementations, the data transmitting unit 1348 is configured to transmit data (e.g., presentation data, location data, etc.) to at least the controller 110. In some implementations, the data transmitting unit 1348 is configured to transmit authentication credentials to the electronic device. To that end, in various implementations, the data transmitting unit 1348 includes instructions and/or logic therefor, and heuristics and metadata therefor.

Although the data obtaining unit 1342, the perspective transforming unit 1344, the XR presenting unit 1346, and the data transmitting unit 1348 are shown as residing on a single device (e.g., the electronic device 120), it should be understood that in other implementations, any combination of the data obtaining unit 1342, the perspective transforming unit 1344, the XR presenting unit 1346, and the data transmitting unit 1348 may be located in separate computing devices.

Moreover, FIG. 13 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including an image sensor, a display, one or more processors, and non-transitory memory:

capturing, using the image sensor, an image of a physical environment;

obtaining a depth map including a plurality of depths respectively associated with a plurality of pixels of the image of the physical environment, wherein the depth map includes, for a particular pixel at a particular pixel location representing a dynamic object in the physical environment, a particular depth corresponding to a distance between the image sensor and a static object in the physical environment behind the dynamic object;

transforming, using the one or more processors, the image of the physical environment based on the depth map and a difference between a first perspective of the image sensor and a second perspective closer to an eye of a user in one or more directions than the first perspective such that the portion of the image corresponding to the dynamic object and including the particular pixel representing the dynamic object is mapped to the same location as the portion of the image corresponding to the static object by treating the particular pixel representing the dynamic object as though the dynamic object were at the particular depth of the static object; and displaying, on the display, the transformed image.

2. The method of claim 1, wherein obtaining the depth map includes determining the particular depth via interpolation using depths of locations surrounding the particular pixel location.

3. The method of claim 1, wherein obtaining the depth map includes determining the particular depth at a time the dynamic object was not represented at the particular pixel location.

4. The method of claim 1, wherein obtaining the depth map includes determining the particular depth based on a three-dimensional model of the physical environment excluding the dynamic object.

5. The method of claim 4, further comprising generating the three-dimensional model.

6. The method of claim 5, wherein generating the three-dimensional model includes adding one or more points to the three-dimensional model at one or more locations in a three-dimensional coordinate system of the physical environment corresponding to one or more static objects in the physical environment.

7. The method of claim 6, wherein adding the one or more points to the three-dimensional model includes determining that the one or more points correspond to the one or more static objects in the physical environment.

8. The method of claim 7, wherein determining that a particular one of the one or more points corresponds to the one or more static objects in the physical environment includes performing semantic segmentation on one or more images.

9. The method of claim 7, wherein determining that a particular one of the one or more points corresponds to the one or more static objects in the physical environment includes detecting the particular point at a same location at least a threshold number of times over a time period.

10. The method of claim 7, wherein determining that a particular one of the one or more points corresponds to the one or more static objects in the physical environment includes determining that surrounding points correspond to the one or more static objects in the physical environment.

11. The method of claim 4, wherein determining the particular depth based on a three-dimensional model includes rasterizing the three-dimensional model.

12. The method of claim 4, wherein determining the particular depth based on the three-dimensional model includes ray tracing based on the three-dimensional model.

13. The method of claim 1, wherein transforming the image of the physical environment based on the depth map further includes smoothing the depth map.

14. The method of claim 1, wherein transforming the image of the physical environment based on the depth map further includes clamping the depth map.

15. A device comprising:

an image sensor;

a display;

a non-transitory memory; and one or more processors to:

capture, using the image sensor, an image of a physical environment;

obtain a three-dimensional model of the physical environment;

obtain, based on the three-dimensional model, a depth map including a plurality of depths respectively associated with a plurality of pixels of the image of the physical environment;

transform, using the one or more processors, the image of the physical environment based on the depth map and a difference between a first perspective of the image sensor and a second perspective closer to an eye of a user in one or more directions than the first perspective such that the portion of the image corresponding to the dynamic object and including the particular pixel representing the dynamic object is mapped to the same location as the portion of the image corresponding to the static object by treating the particular pixel representing the dynamic object as though the dynamic object were at the particular depth of the static object; and display, on the display, the transformed image.

16. The device of claim 15, wherein the three-dimensional model includes a three-dimensional mesh.

17. The device of claim 15, wherein the three-dimensional model is based on objects in the physical environment determined to be static.

18. A non-transitory computer-readable memory having instructions encoded thereon which, when executed by one or more processors of a device including an image sensor and a display, cause the device to:

capture, using the image sensor, an image of a physical environment;

obtain a temporally stable depth map including a plurality of depths respectively associated with a plurality of pixels of the image of the physical environment, wherein the temporally stable depth map excludes depths based on distances between the image sensor and dynamic objects;

transform, using the one or more processors, the image of the physical environment based on the temporally stable depth map and a difference between a first perspective of the image sensor and a second perspective closer to an eye of a user in one or more directions than the first perspective such that the portion of the image corresponding to the dynamic object and including the particular pixel representing the dynamic object is mapped to the same location as the portion of the image corresponding to the static object by treating the particular pixel representing the dynamic object as though the dynamic object were at the particular depth of the static object; and display, on the display, the transformed image.

19. The non-transitory computer-readable memory of claim 18, wherein a particular depth of the plurality of depths corresponds to a distance between the image sensor and a static object in the physical environment behind the dynamic object.

20. The non-transitory computer-readable memory of claim 18, wherein obtaining the temporally stable depth map is based on a three-dimensional model of the physical environment.

* * * * *